United States Patent [19]

McCumber et al.

[11] Patent Number: 4,620,141
[45] Date of Patent: Oct. 28, 1986

[54] RAIN-CONTROLLED WINDSHIELD WIPERS

[75] Inventors: Roger D. McCumber; Rein S. Teder, both of Minnetonka, Minn.

[73] Assignee: Vericom Corp., Minnetonka, Minn.

[21] Appl. No.: 751,544

[22] Filed: Jul. 3, 1985

[51] Int. Cl.$^4$ .............................................. B60S 1/08
[52] U.S. Cl. .................................... 318/483; 318/444; 318/480; 318/DIG. 2; 15/250 C
[58] Field of Search ............... 318/443, 444, 480, 483, 318/484, DIG. 2; 15/250 C

[56] References Cited

U.S. PATENT DOCUMENTS

| 3,743,056 | 7/1973 | Zitelli et al. | 318/480 X |
| 4,131,834 | 12/1978 | Blaszkowski | 318/483 |
| 4,355,271 | 10/1982 | Noack | 318/480 |
| 4,463,294 | 7/1984 | Gibson | 318/313 |
| 4,476,419 | 10/1984 | Fukatsu et al. | 318/444 |
| 4,481,450 | 11/1984 | Watanabe et al. | 318/444 |
| 4,495,452 | 1/1985 | Boegh-Peterson | 318/444 |

FOREIGN PATENT DOCUMENTS

| 59-89250 | 5/1984 | Japan | 15/250 C |
| 59-106348 | 6/1984 | Japan | 15/250 C |

*Primary Examiner*—Bernard Roskoski
*Assistant Examiner*—Bentsu Ro

*Attorney, Agent, or Firm*—Orrin M. Haugen; Thomas J. Nikolai

[57] ABSTRACT

An electronic control system for windshield wipers on motor vehicles for initiating wiping action in response to the occurrence and level of precipitation on the windshield. A sensor unit comprising a block containing an array of photo-sensors arranged in a bridge configuration and a corresponding array of light sources is mounted on the inside surface of the windshield at a location traversed by the path of the vehicle's windshield wiper blades. The photo-sensor elements are oriented to normally receive light reflected back from the glass/air interface at the outside windshield surface from the photo-emitters, but when rain is present on the windshield, the light rays are scattered to create an unbalanced condition. The unbalancing of the bridge creates a signal which is demodulated in a synchronous demodulator and then applied via an automatic gain control (AGC) circuit to a window comparator. The comparator output is, in turn, applied to a voltage-controlled oscillator such that the frequency of the pulse produced thereby is determined by the precipitation level. The oscillator output then is applied to a wiper motor relay to pulse the same into operation. The use of the synchronous demodulator, AGC error amplifier and window comparator results in a system which operates in a reliable manner under severe ambient conditions.

7 Claims, 4 Drawing Figures

RAIN-CONTROLLED WINDSHIELD WIPERS

BACKGROUND OF THE INVENTION

I. Field of the Invention

This invention relates generally to an electronic control circuit for controlling the operation of a motor vehicle's windshield wiper blades, and more particularly to an electronic control circuit responsive to the presence of rain to automatically activate the vehicle's windshield wipers at a rate dictated by the level of precipitation being encountered.

II. Discussion of the Prior Art

Heretofore, motor vehicles having windshields have been equipped with motor-driven windshield wipers and associated with the wiper motor is a manually-operated multiposition switch whereby the driver can turn on and select the speed at which the wiper blades will be driven. While earlier model vehicles generally allowed selection of only a slow and a fast wiper sweep speed, more recently, wiper controls have also included a delay circuit whereby the operator can manually adjust the duty cycle of the wiper motor.

The present invention comprises an improvement over the aforementioned manually-operated windshield wiper motor controls which permits the automatic operation of the windshield wiper motor when rain droplets collect on the surface of the windshield. Broadly speaking, other such automatic control circuits are known in the art. For example, in the Fukatsu et al U.S. Pat. No. 4,476,419, there is described a windshield wiper control device which includes a light source mounted on the vehicle's hood outside of the passenger compartment which directs a beam of light onto a sensor attached to the vehicle's rearview mirror located within the passenger compartment. The presence of rain on the windshield disturbs the pattern of light transmitted through the windshield, causing a circuit response to the change in contrast to develop a signal for the wiper motor to cause it to turn on and to sweep at a rate determined by the level of precipitation.

In the Noack U.S. Pat. No. 4,355,271, a plurality of infrared light sources are arranged to transmit IR light from the interior of the windshield toward its exterior surface and a common IR sensor is positioned to normally intercept the IR energy reflected back from the air-glass interface at the outside surface of the glass. The presence of rain or dust particles on the exterior windshield surface affects the amount of IR reflected back on to the sensor and the resulting signal shift is compared in a series of comparators with predetermined threshold values whereby a determination is made whether water droplets or dust particles are present on the windshield. If it is dust-particles, the windshield washer pump is turned on along with the wiper blades to clear the windshield. On the other hand, if it is water droplets that is causing the shift in the IR energy reaching the sensor, then only the wiper blades are activated.

Other windshield wiper control schemes are described in the Blaszkowski U.S. Pat. No. 4,131,834; the Gibson U.S. Pat. No. 4,463,294; and the Boegh-Peterson U.S. Pat. No. 4,495,452. A system for automatically operating the window motors to close the windows of a vehicle upon the detection of rain is set out in the Watanabe et al U.S. Pat. No. 4,481,450.

The present invention is deemed to offer significant advantages over the windshield wiper control systems of the prior art discussed above. As will be described in greater detail hereinbelow, the control circuitry of the present invention carries out its desired function in a highly reliable manner over prolonged periods of use and under a wide variety of adverse ambient conditions.

SUMMARY OF THE INVENTION

For sensing the presence of water droplets on the exterior surface of the windshield, there is mounted on the interior surface of the windshield a block-like housing containing a plurality of bores which are directed at a predetermined angle to the general plane of the windshield and into which are fitted a corresponding plurality of light pipes or rods and light-emitting diodes, preferably of the type operating in the infrared portion of the spectrum. Also contained in the block-like housing is another corresponding set of bores which are inclined with respect to the first plurality of bores so that the center lines of each would intersect at points at the exterior surface of the glass windshield when the housing is affixed to the inside surface of that windshield. The second set of bores contain light conducting rods and photo-sensitive devices responsive to light in the IR spectrum. The photo-emitters and photo-sensors are connected by suitable conductors to an electronic detector module which would generally be located beneath the dashboard of the vehicle.

The IR light-emitting diodes are pulsed at a predetermined frequency by an oscillator circuit. The photo-sensors are configured to reside in the four branches of a Wheatstone bridge circuit which is normally in a balanced condition when the IR radiation from the individual sources is reflected back from the air-glass interface of the windshield to the photo-detectors. The presence of water droplets on the surface of the windshield, however, results in a change in the effective angle at which the light strikes the air/water surface because air has a different refractive index than water and allows more of the light to escape. Also, the point of reflection moves further away from the glass boundary so that the light does not strike the sensor rods. This, of course, unbalances the bridge and produces a current signal through a voltage variable resistor (JFET) controlled by an AGC error amplifier.

The signal developed across the voltage variable resistor is applied, via a synchronous demodulator, which is driven by the oscillator driving the light-emitting diodes, to a first input of the AGC error amplifier which compares that signal to a fixed reference. When the bridge network is initially established as creating a quiescent current $I_o$ when the windshield is dry, the AGC error amplifier functions to maintain its output at a predetermined positive voltage. In the event of a change in the quiescent state of the bridge due to the presence of moisture on the windshield, that $I_o$ signal changes and the change is applied to a window comparator circuit which functions to produce a binary hi output irrespective of the direction of change.

The signal out of the window comparator is integrated and then applied as an input to a voltage-controlled oscillator and it is the output of the VCO that ultimately triggers a sweep of the wiper blades. Because of the manner in which the VCO is configured, the frequency at which blade sweep is triggered is directly proportional to the level of precipitation encountered.

OBJECTS

It is accordingly a principal object of the present invention to provide a new and improved control circuit for the windshield wipers of a motor vehicle.

Another object of the invention is to provide a windshield wiper control circuit which becomes operational upon the detection of moisture droplets on the windshield.

Still another object of the invention is to provide a windshield wiper control circuit wherein the rate at which the blades are made to sweep the windshield is proportional to the precipitation level encountered.

Yet another object of the invention is to provide an automatic windshield wiper control circuit which senses the presence of rain to automatically initiate operation, but which is substantially immune to false triggering occasioned by changes in ambient conditions other than rain or mist.

These and other objects and advantages of the invention will become apparent to those skilled in the art from the following detailed description of a preferred embodiment, when considered in conjunction with the accompanying drawings in which like numerals in the several views refer to corresponding parts.

DESCRIPTION OF A PREFERRED EMBODIMENT

Figure 1:
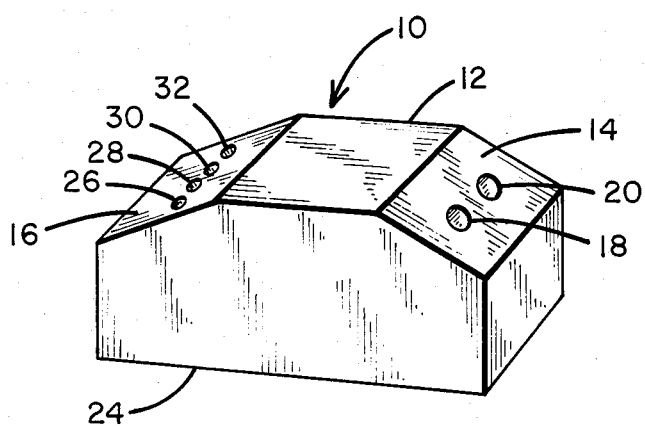
FIG. 1 illustrates the mechanical construction of the sensor unit used in the present invention.
Figure 2:
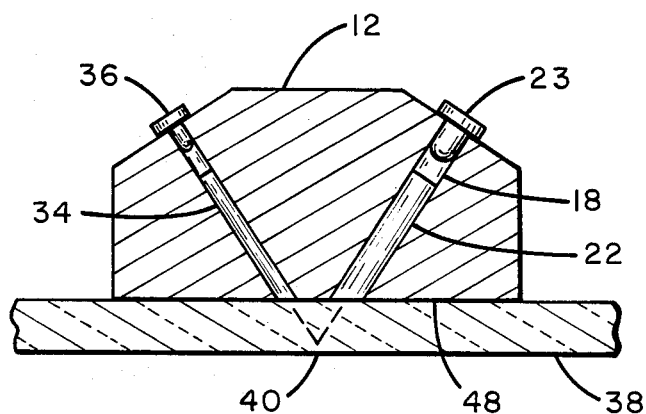
FIG. 2 is a cross-sectional view of FIG. 1.

Referring first to FIGS. 1 and 2, the rain sensor unit is indicated generally by numeral 10 and is seen to comprise a block 12 of opaque material having chamfered surfaces 14 and 16 which form an angle of approximately 45° with the horizontal. Drilled or otherwise formed in the chamfered surface 14 and extending at an angle of approximately 45° with respect to the base of the block 12 are a pair of bores 18 and 20. For purposes of illustration only and without intending any limitation, the bores 18 and 20 may be 7/32nds of an inch in diameter which will allow a 3/16th inch Lucite rod or light pipe 22 to be placed into the bore, the lower end of the light pipe being shaped to be coplanar with the base 24 of the opaque block 12. Also fitted in each of the bores 18 and 20 is a light-emitting diode (LED) preferably emitting radiation in the the infrared spectrum.

In a similar fashion, there is formed in the chamfered surface 16 of the block 12 a plurality (four) of cylindrical bores 26, 28, 30 and 32. These bores also extend at an angle of approximately 45° to the horizontal and intersect with the base 24 at a point which is spaced approximately 0.47 inches from the point of intersection of the bores 18 and 20 with the base 24.

The bores 26–32 may be 5/32nd of an inch in diameter so as to receive ⅛th diameter acrylic or other clear plastic rods, such as 34 in FIG. 2. Fitted into the upper end of the bores 26–32 and communicating with the acrylic light pipes 34 are a plurality of photo-transistors, only one of which is shown in FIG. 2 and which is identified by numeral 36.

The block 12 is arranged to be adhesively bonded to the vehicle's windshield 38. When it is considered that windshield glass is generally 0.230 inches in thickness and given the angle at which the respective bores 18–20 and 26–32 make with the windshield surface 38, the point of intersection of light passing through the light pipes 22 with the imaginery axis of the sensor bores 26–32 is at the exterior surface 40 of the glass sheet 38. Thus, the geometry is such that taking into account the change in the index of refraction between glass and air at the surface 40, light from the LED's 23 will be reflected up through the light pipes 34 and onto the associated photo-transistor sensors 36 contained within the bores 26–32. The presence of water droplets on the outer surface 40 at the point of intersection of the light from the LED's 23 will alter angle and position of the reflected light and will cause the light to be scattered so that it no longer uniformly passes through the light pipes 34 associated with the photo-transistor sensors 36. As will be explained in greater detail, it is this change in light intensity reaching the sensors that ultimately triggers the windshield wipers into action.

Figure 3:
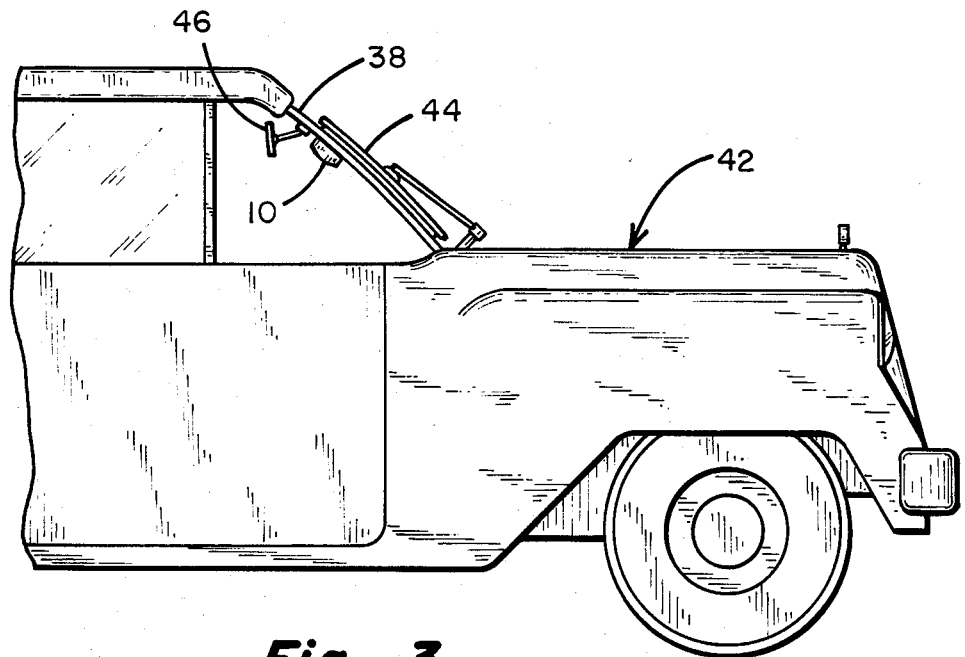
FIG. 3 illustrates the manner in which the sensor unit of FIG. 1 may be mounted on a windshield.

Referring to FIG. 3, there is shown a motor vehicle 42 having a windshield 38 and a windshield wiper 44 of a conventional design which is driven by a wiper motor (not shown) to cause the blade 44 to oscillate back and forth across the windshield surface to remove rain or the like therefrom. Tucked up behind the rear-view mirror 46 in the passenger compartment is the sensor housing 10. Being behind the rear-view mirror 36, the unit 10 does not interfere with the field of view of the driver or passenger. The unit 10 is, however, positioned in the path swept by the wiper blade 44.

Incidentally, in those installations where the windshield glass thickness is found to be less than 0.230 inches, it is contemplated that an acrylic or other clear plastic shim 48 of a suitable thickness may be inserted between the base 24 of the housing 12 and the interior surface of the windshield so as to increase the effective thickness of the glass to the desired 0.230 inches.

Having described the mechanical configuration of the sensor unit 10, consideration will next be given to the electronic circuit which is used to monitor the condition of the IR light reaching the photo-sensors. In this regard, reference is made to the circuitry of FIG. 4.

Figure 4:
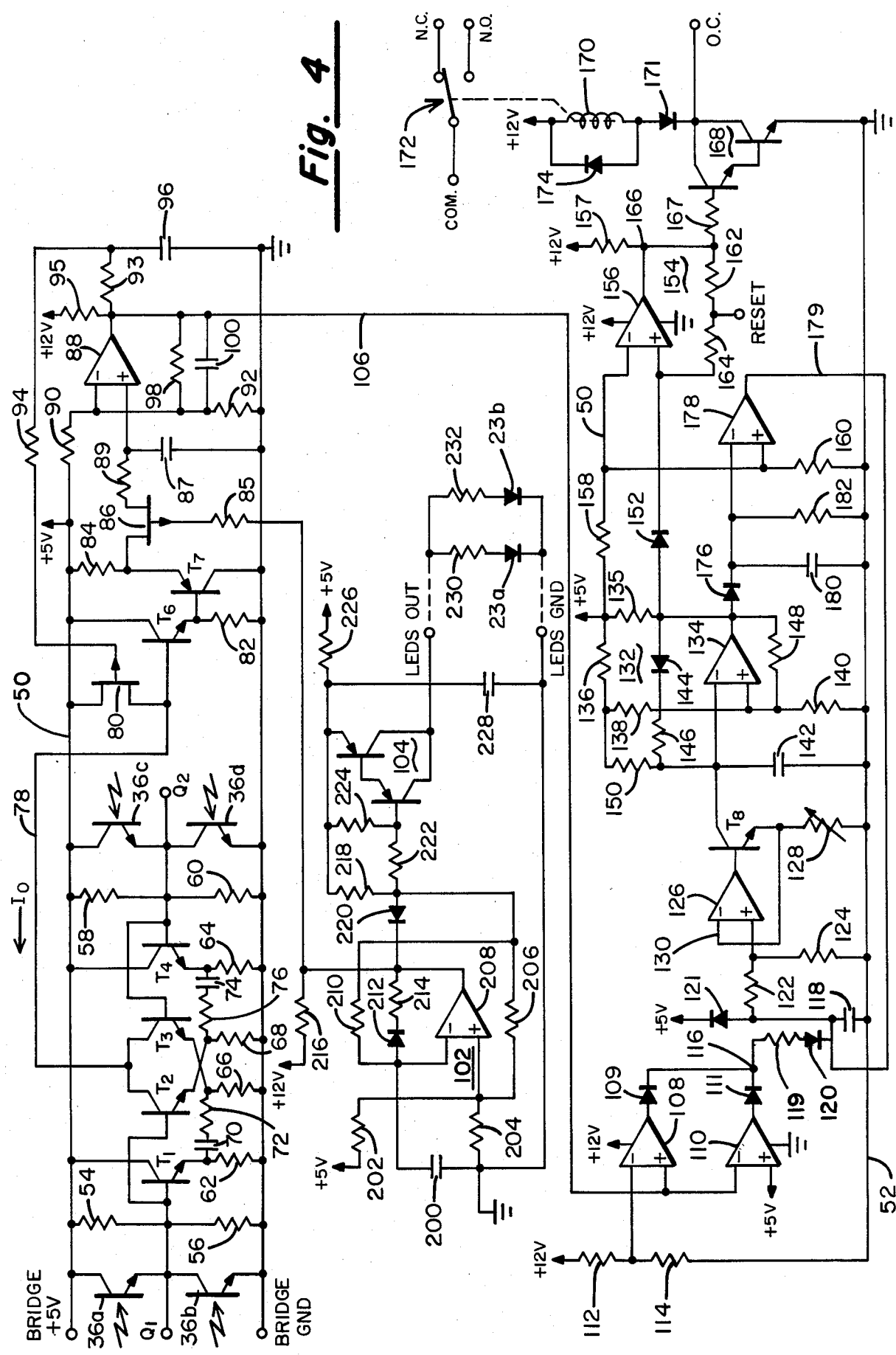
FIG. 4 is an electrical schematic diagram of the circuitry implementing the control system of the present invention.

The photo-sensors 36 contained within the bores 26, 28, 30 and 32 are identified in FIG. 4 by numerals 36(a) through 36(d) and comprise photo-transistors. Photo-transistors 36(a) and 36(c) have their emitter electrodes tied to a terminal $Q_1$ or $Q_2$ and their collector electrodes tied to the positive rail 50. Devices 36(b) and 36(d) are connected such that their emitters are tied to the ground bus while their collectors are connected to the $Q_1$ or $Q_2$ terminals. Connected directly and parallel with each of the photo-transistors is a shunt resistor 54, 56, 58 or 60. Coupled between the terminals $Q_1$ and $Q_2$ is an absolute value difference amplifier comprised of transistors $T_1$, $T_2$, $T_3$ and $T_4$.

As is illustrated, transistors $T_1$ and $T_2$ each have their base electrodes tied to the input terminal $Q_1$ and, similarly, the base or control electrodes of the transistors $T_3$ and $T_4$ are tied to the input terminal $Q_2$. Resistors 62 and 64 are connected between the emitter electrodes of the transistors $T_1$ and $T_4$ to the negative or ground rail 52. Similarly, resistors 66 and 68 couple the emitter electrodes of transistors $T_3$ and $T_2$, respectively, to the negative bus or rail 52. A series combination of a capacitor 70 and a resistor 72 couples the emitter electrode of transistor $T_1$ to the emitter electrode of transistor $T_3$ while a series combination of a capacitor 74 and a resistor 76 couple the emitter electrode of the transistor $T_2$ to the emitter electrode of transistor $T_4$.

Examination of the circuitry thus far described reveals that the photo-sensors $36(a)-36(d)$ are configured in a Wheatstone bridge arrangement with the absolute value difference amplifier comprised of transistors $T_1-T_4$ being connected across the output terminals of that bridge. The input terminals to the bridge are, respectively, the positive rail 50 and the ground rail 52. When the IR light reaching each of the photo-transistors is approximately equal, which condition prevails when no moisture is present on the windshield of the vehicle, a predetermined current $I_0$ is made to flow through the conductor 78 where it divides approximately equally between the transistors $T_2$ and $T_3$. However, if a rain droplet appears on the windshield proximate one of the four bores containing one of the sensors $36(a)-36(d)$, the light from the source 18 or 20 will be altered and will result in a change in the magnitude of the current from its quiescent value $I_0$.

A voltage variable resistor (JFET) 80 is connected between the positive rail 50 and the conductor 78. The conductor 78 is also tied to the base or control electrode of a common emitter transistor $T_6$ whose emitter or output electrode is tied to the base electrode of a further transistor amplifier $T_7$. Resistors 82 and 84 establish the bias for the emitter follower stages.

The output from the emitter follower stage $T_7$ is coupled through a semiconductor switching device 86 and resistor 89 to the non-inverting input of a AGC error amplifier 88. The semiconductor switch device functions as a synchronous demodulator. The inverting input of the error amplifier 88 is tied to the common junction between the series coupled resistors 90 and 92 which together constitute a conventional voltage divider coupled between the positive rail 50 and the ground bus 52, forming a reference voltage for the AGC. The AGC error signal is fed back through resistors 92 and 94 to the control electrode of the voltage variable resistor or JFET 80. A filter capacitor 96 is tied between the common junction of resistors 92 and 94 and the ground rail 52, which introduces an overall AGC error amplifier time constant. A resistor 98 in parallel with a capacitor 100 is coupled between the output of the error amplifier 88 and its inverting input terminal, setting the overall gain of the AGC feedback loop.

The control electrode of the JFET 86 is tied to the output of an oscillator circuit indicated generally by numeral 102, that circuit being the same as is used to drive the IR LED's $23(a)$ and $23(b)$ in FIG. 4. The oscillator 102 is of conventional design and which, operating through the driver circuit 104, pulses the LED's on a one percent duty cycle. Typically, but with no limitation intended, the LED's $23(a)$ and $23(b)$ may operate with a 30 microsecond pulse followed by a three millisecond off time. In addition to driving LED sources, the oscillator 102 is also connected to the control electrode of the JFET 86 used to couple the signal produced upon unbalancing of the bridge to the non-inverting input of the AGC error input, synchronously demodulating the bridge output signal.

The output from the AGC error amplifier 88 is applied via conductor 106 to a pair of difference amplifiers 108 and 110 which are configured as a window comparator. More particularly, the inverting input of the operational amplifier 108 is tied to the common junction between series connected resistors 112 and 114 which series resistors are, in turn, connected between a source of positive potential ($+12$ volts) and the ground rail 52. Similarly, the operational amplifier 110 has its non-inverting input tied to a fixed voltage source ($+5$ volts). Thus, if the signal from the AGC error amplifier 88 falls outside of the upper and lower reference voltages applied to the comparators 108 and 110, node 116 goes high and the capacitor 118 begins to charge up through the resistor 119 and the diode 120. A voltage divider comprising resistors 122 and 124 is connected across the timing capacitor 118 and to the non-inverting input of operational amplifier 126. Thus, this signal is applied to the non-inverting input of an operational amplifier 126 whose output is coupled to the base electrode of a transistor $T_8$. The emitter of this transistor is shown as being coupled through an adjustable potentiometer 128 to the ground rail and the emitter electrode is also tied by a conductor 130 to the inverting input of the operational amplifier 126. Resistor 128 may just as well be a fixed resistor. The combination of the operational amplifier 126 and the transistor $T_8$ form a current source whose output is determined by the control voltage developed across the capacitor 118.

The signal developed at the collector electrode of the current source transistor $T_8$ connects to the input of a voltage controlled oscillator (VCO) 132. The VCO comprises an operational amplifier 134 having its inverting input coupled to the collector of the current driver $T_8$ and its non-inverting input tied to a point of fixed potential determined by the voltage divider which includes the resistors 136, 138 and 140. A capacitor 142 is connected between the inverting input of the operational amplifier 134 and ground rail 52. A feedback circuit including a diode 144 and a resistor 146 are connected in series between the output of the operational amplifier 134 and its inverting input. Similarly, a feedback resistor 148 couples the output of that operational amplifier back to its non-inverting input. A further resistor 150 is connected between the resistor 136 and the inverting input of the operational amplifier 134.

The output from the VCO is coupled through a diode 152 to a latch circuit 154 which consists of an operational amplifier 156 having a fixed reference voltage applied to its inverting input via a voltage divider comprising resistors 158 and 160 which are connected in series between the positive rail 50 and the negative rail 52. Completing the latch are feedback resistors 162 and 164 which are connected in series with one another between the output terminal 166 of the latch circuit 156 and its non-inverting input terminal.

The output from the latch circuit is used to drive a Darlington circuit 168 and it is the conduction of this circuit that ultimately determines the energization of the wiper motor relay coil 170. The relay coil 170 has associated with it a set of single pole, double throw contacts 172. A diode 174 is connected in parallel with the relay coil 170 to limit inductive spikes which might otherwise damage the transistors comprising the Darlington pair 168.

The output from the VCO 132 is also coupled through a semiconductor diode 176 to the inverting input terminal of an operational amplifier 178 and to a timing circuit including the parallel combination of resistor 182 and capacitor 180. The op amp 178 and the timing components function as a lock-out circuit. The function of the lock-out timer will be explained in detail below when the overall description of the circuit operation is set out.

OPERATION

As long as the windshield is dry, the pulsating light emanating from the LED infrared sources 23(a) and 23(b) will be reflected by the windshield interface back through the light pipe 34 in the bores 26-32 so as to substantially equally stimulate the photo-sensors 36(a)-36(d). As such, the bridge configuration in which they are disposed will be effectively balanced and a predetermined pulsed quiescent current, $I_0$, flows through the voltage variable resistor 80 and is synchronously demodulated to establish the normal operating point for the AGC error amplifier 88. Should the battery potential or component values begin to degrade after prolonged use, the error amplifier 88 will cause a shift in its output which is fed back through the resistor 94 to the control electrode of the voltage variable resistor (JFET) 80 to cause it to create a compensating shift in the quiescent level.

Again, assuming that no raindrops are present on the windshield, the output from the window comparators 108 and 110 will be low such that the voltage controlled oscillator 132 will not generate pulses to set the latch 156 and the relay coil 170 will not be energized.

Next, let it be assumed that water droplets begin to collect on the windshield and that one or more of such droplets fall in the zone on the windshield in the field of view of the light pipes 34 contained within the bores 26-32 of the sensor unit 10. As mentioned, the presence of water droplets on the windshield creates a significant change in the angle and position of the light beams so that the amount of light traversing one or more of the light pipes back to the photo-sensors 36(a)-36(b) will result in a shift in the balance point of the bridge circuit. This shift results in an increase or decrease in the current flow through the conductor 78 and through the voltage variable resistor 80. Hence, a signal indicative of the shift of the bridge is coupled through the emitter follower stages $T_6$ and $T_7$ and through the synchronous demodulator circuit 86 driven by the oscillator 102 to alter the input of the AGC circuit 88.

The output from the AGC error amplifier 88 is applied via conductor 106 to the inputs of the operational amplifiers 108 and 110 comprising the window comparator. Assuming that the rain droplets have caused a substantial shift in the balancing point of the bridge circuit, the applied signal will fall outside of the limits established for the window comparator, causing a high signal to be developed at the node 116. The capacitor 118 thus begins to charge up. This potential, in turn, causes the current source comprised of the operational amplifier 126 and the NPN transistor $T_8$ to inject a current into the capacitor 142. The resulting voltage developed across that capacitor is applied as an input to the voltage controlled oscillator 132, causing it to output a signal to the latch circuit 154. The signal output from the voltage controlled oscillator is also coupled through a timed lock-out circuit 178 which, via conductor 179, holds the junction 116 low, irrespective of the signal emanating from the window comparator due to the unbalance of the sensor bridge. Following expiration of a predetermined time delay set by the capacitor 180 and the resistor 182, the potential at the node 116 is again released and is free to go high, again assuming that the bridge is unbalanced at the time that the lock-out signal is released. Thus, once the Darlington pair 168 is triggered into conduction to energize the motor control relay 170, the wiper blades will be made to traverse the windshield. If it were not for the lock-out circuit, the operation of the blade pushing water across the windshield into the field-of-view of the photo-sensors could create a sort of self-oscillating condition. To avoid this, for a fixed amount of time, on the order of a second or two after a wipe has been initiated, further water droplets continuing to unbalance the bridge have no effect on actuating the motor control relay.

The latch circuit 154 is included to adapt the present invention to the wiper control circuitry of Chrysler Corporation automobiles. Where the present invention is to be installed on a General Motors automobile or a Ford Motor Company vehicle, the terminal labeled "Reset" is merely grounded which thus disables the latch feature.

The present invention, when mounted in the passenger compartment of an automobile, may encounter a wide variety of ambient conditions including temperature changes, electro-magnetic interference, variations in light impinging upon the windshield, etc. The circuit of the present invention has been designed to operate in these somewhat hostile environments in a very reliable fashion. By including the AGC amplifier 88, variations in battery voltage, component values and shifts in operating points due to temperature changes and the like are compensated for. Because the synchronous demodulator JFET 86 is driven by the one percent duty cycle oscillator 102 driving the LED's, it is only when the LED 23(a) and 23(b) are energized that the AGC error amplifier 88 is capable of receiving meaningful information from the bridge network. At all other times, i.e., 99 percent of the time, the AGC amplifier 88 and all of the circuitry downstream therefrom is effectively removed from the system and cannot cause spurious operation of the windshield wiper motor due to noise conditions.

It is also found that the pulsing of the LED devices 23(a) and 23(b) allows them to maintain their normal intensity output for longer periods of time than if they are continuously energized.

The voltage-controlled oscillator 132 can also be considered as a rain-controlled oscillator. As the intensity of the rainfall increases, the triggering pulses out of the oscillator increase in frequency. When the rain ceases, the wipers do not suddenly shut off but, instead, operate at a slower and slower repetition rate until the rain-controlled oscillator stops. At that time, resistors 130 and 150 bring the rain-controlled oscillator into a pre-triggered state. This state allows that a very small amount of rain, and hence a small control voltage output, will cause the wipers to be actuated at least once.

For purposes of illustration only and with no limitation intended, the following table sets forth component values which may be used in implementing the system of the present invention:

TABLE I

| Resistors | |
|---|---|
| 54, 56, 58, 60, 62, 64, 84, 90, 112, 135 | 1 k ohm |
| 66, 68 | 47 k ohms |
| 72, 76 | 330 ohms |
| 82, 92, 95, 114, 140, 148, 160, 162, 164, 204 | 10 k ohms |
| 85, 93, 121, 122, 182 | 1 m ohm |
| 89 | 3.3 k ohms |
| 146 | 33 k ohms |
| 98 | 270 k ohms |
| 124 | 330 k ohms |
| 119 | 150 k ohms |
| 150, 138 | 470 k ohms |

TABLE I-continued

| | |
|---|---|
| 136 | 68 k ohms |
| 158 | 20 k ohms |
| 216, 128 | 100 k ohms |
| 218 | 2.7 k ohms |
| 226 | 10 ohms |
| 230, 232 | 1 ohm |
| Capacitors | |
| 70, 74 | 0.1 mf |
| 87 | 0.01 mf |
| 96, 118, 142 | 10 mf |
| 180 | 1 mf |
| Transistors | |
| $T_1, T_2, T_3, T_4, T_6, T_8$ | 2N3904 |
| $T_7$ | 2N3906 |
| 168 | 2N6715 |
| Diodes | |
| 220, 212, 109, 111, 120, 121, 152, 144, 176 | 1N4148 |
| 171, 174 | 1N4001 |
| Op. Amp | |
| 88, 108, 110, 126 | LM 324 |
| Comparators | |
| 134, 156, 178, 208 | LM 339 |

This invention has been described herein in considerable detail, in order to comply with the Patent Statutes and to provide those skilled in the art with information needed to apply the novel principles, and to construct and use such specialized components as are required. However, it is to be understood that the invention can be carried out by specifically different equipment and devices, and that various modifications, both as to equipment details and operating procedures can be effected without departing from the scope of the invention itself.

What is claimed is:

1. In a motor vehicle of the type incorporating a windshield and a motor-driven windshield wiper, an improved windshield wiper motor controller for automatically activating the motor of said motor-driven windshield wiper upon detection of moisture droplets on the exterior surface of said windshield, comprising:

(a) an opaque housing secured to the inside surface of said windshield, said housing having a first and a second plurality of bores whose longitudinal axes intersect at points at the exterior surface of said windshield and at an acute angle to the plane of the windshield, said first plurality of bores including individual radiant energy sources and said second plurality of bores including individual radiant energy sensors, individual ones of said sources being associated with individual ones of said sensors;

(b) driver means for periodically energizing said radiant energy sources with pulses of a predetermined duty cycle;

(c) balanced detector means coupled to said plurality of radiant energy sensors for detecting changes in the amount of light energy from said individual radiant energy sources impinging on its associated radiant energy sensor, and producing an error signal proportional to the degree of unbalance of said detector means;

(d) synchronous switching means coupled to said driver means for switching said error signal on and off in synchronism with said pulses from said driver means;

(e) comparator means coupled to said synchronous switching means for producing a voltage output when the amplitude of said error signal falls outside of a predetermined range of amplitudes; and (f) a voltage-controlled oscillator having an input and an output, said input being coupled to receive said voltage output of said comparator means and said output being coupled in controlling relation to said motor.

2. The motor controller as in claim 1 wherein said radiant energy sources are infrared light-emitting diodes.

3. The motor controller as in claim 1 wherein said radiant energy sensors comprises four photo-diodes connected in a Wheatstone bridge configuration and said balanced detector means comprises an absolute value difference amplifier having input terminals coupled across the output terminals of said Wheatstone bridge.

4. The motor controller as in claim 3 wherein said balanced detector means further includes an AGC circuit for comparing a signal from said absolute value difference amplifier with a predetermined reference and producing said error signal.

5. The motor controller as in claim 4 wherein said synchronous switching means comprises a semiconductor switching device driven by said driver means and operatively coupled between the output of said absolute value difference amplifier and said AGC circuit.

6. The motor controller as in claim 1 and further including an inhibiting circuit coupled to inhibit operation of said voltage-controlled oscillator for a predetermined period of time following a prior actuation of said motor.

7. The motor controller as in claim 6 and further including a relay; a semiconductor switch connected in series with said relay across a direct current voltage source; and a latching circuit coupling the output of said voltage-controlled oscillator to a control terminal of said semiconductor switch.

* * * * *